Figure 1:
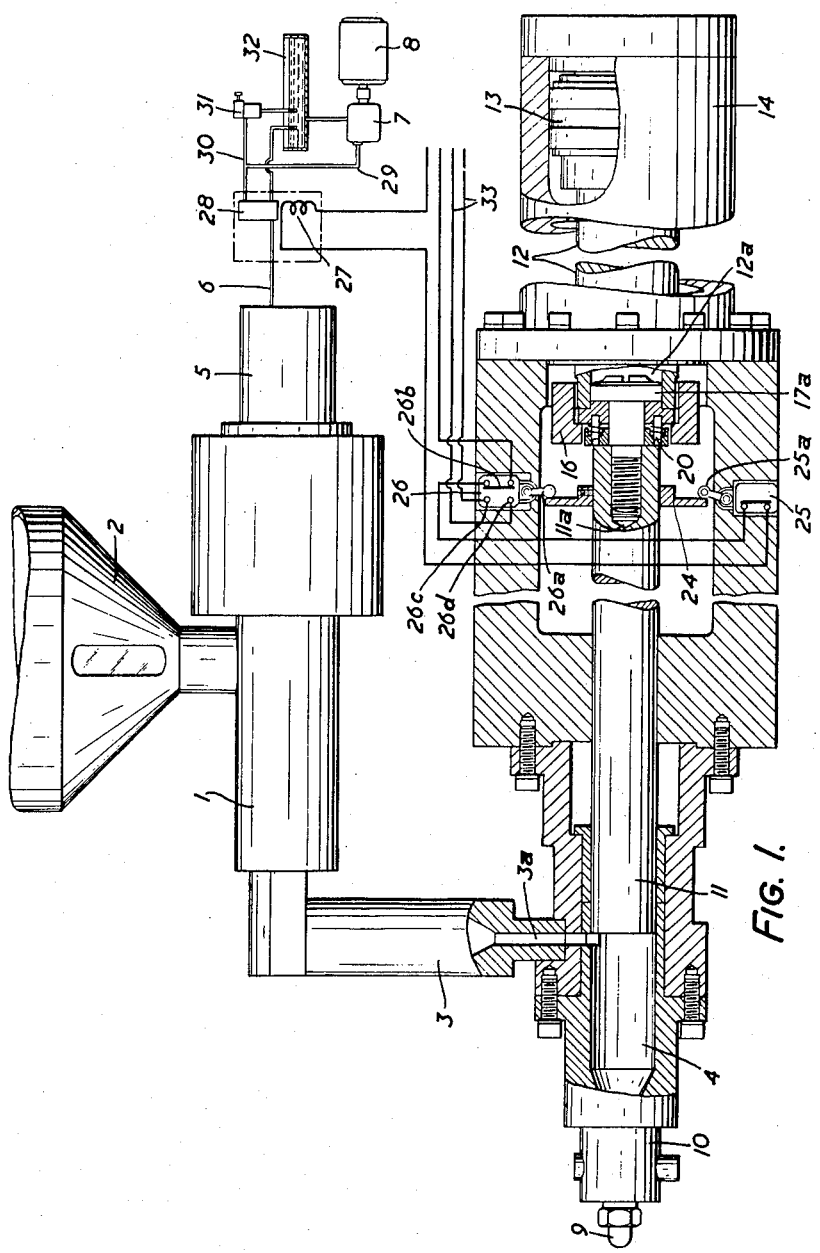

Dec. 27, 1960 S. C. H. SMITH 2,965,929
INJECTION MOULDING MACHINES
Filed Jan. 16, 1959 2 Sheets-Sheet 1

INVENTOR
S.C.H. Smith
BY
Holcomb, Wetherill & Brisebois
ATTORNEYS

United States Patent Office 2,965,929
Patented Dec. 27, 1960

2,965,929

INJECTION MOULDING MACHINES

Samuel Charles Henry Smith, Surbiton, England, assignor to R. H. Windsor Limited Filed Jan. 16, 1959, Ser. No. 787,166

Claims priority, application Great Britain Jan. 21, 1958

8 Claims. (Cl. 18—30)

This invention relates to improvements in injection moulding machines of the kind having a preplasticising chamber in which thermoplastic material, fed into said chamber in powder or granular form, is rendered plastic prior to being ejected from said chamber into an injection or transfer cylinder from which the plasticised material is in turn ejected by a plunger or piston through an injection nozzle into a mould for moulding the final product. The material is ejected from the preplasticising chamber into the transfer or injection cylinder, through a suitable connecting conduit by an hydraulically operated piston or plunger or by any other suitable means such as a screw conveyor or combined screw conveyor or plunger.

In the known construction of injection moulding machines of this type there is no means of ascertaining when the transfer chamber is full, and it is customary for the material being fed from the preplasticising chamber to the injection or transfer cylinder to remain under pressure in the preplasticiser whilst the ram of the injection or transfer chamber transfers the material into the mould, and the only indication that the transfer or injection chamber is full are indications of excess pressure on the mechanism driving the screw or plunger of the preplasticising unit, or controlling the system by a time base circuit which hitherto has resulted in complexity in operation and the filling of the transfer or injection chamber to varying degrees if the said chamber is not entirely emptied on the previous discharge. This has the effect of seriously unbalancing the injection plunger and subjecting the whole preplasticiser to an unnecessary pressure with consequent wastage of power.

Ideally the power source operating the plunger or screw mechanism of the preplasticising chamber is released as soon as the transfer or injection cylinder is full of thermoplastic material under a predetermined pressure, but the release of the pressure in the preplasticising unit in this way has hitherto presented considerable difficulties.

The main object of this invention is to provide a means for releasing the power from the preplasticising unit as soon as the transfer or injection chamber is full of material under a predetermined pressure, and until the injection or transfer ram has delivered a charge of preplasticised material and returned to its original retracted position, leaving a cavity in the injection or transfer cylinder ready to receive a further required amount of preplasticised material.

This object is achieved according to the invention, by utilising the pressure of the material in the transfer or injection cylinder to operate a control valve for releasing power from the preplasticising unit when the pressure of the material in the transfer or injection chamber reaches a predetermined value.

Thus according to the invention the injection moulding machine comprises a preplasticing unit, means for feeding thermoplastic material from said unit into an injection or transfer chamber and a plunger slidable in said chamber for injecting thermoplastic material from said chamber into a mould, wherein said plunger is coupled to the piston rod of a piston for operating said plunger by an axially yieldable coupling whereby said plunger can move back beyond its normal retracted position to an extreme end position under the pressure of the thermoplastic material in the injection or transfer chamber to operate switch means for stopping the preplasticising unit when the said pressure exceeds a predetermined value and while the thermoplastic material is being injected into the mould.

In a preferred embodiment of the invention the switch means operates a solenoid of a control valve for cutting off the power operating the piston or screws of the preplasticising unit or a motor or other source of power operating said piston or screws, said switch means automatically returing to its former position when the plunger of the transfer or injection cylinder moves forward to inject material into the mould.

In order that the invention may be more clearly understood one particular embodiment thereof will now be described, by way of example, with reference to the accompanying drawings in which—

Figure 2:
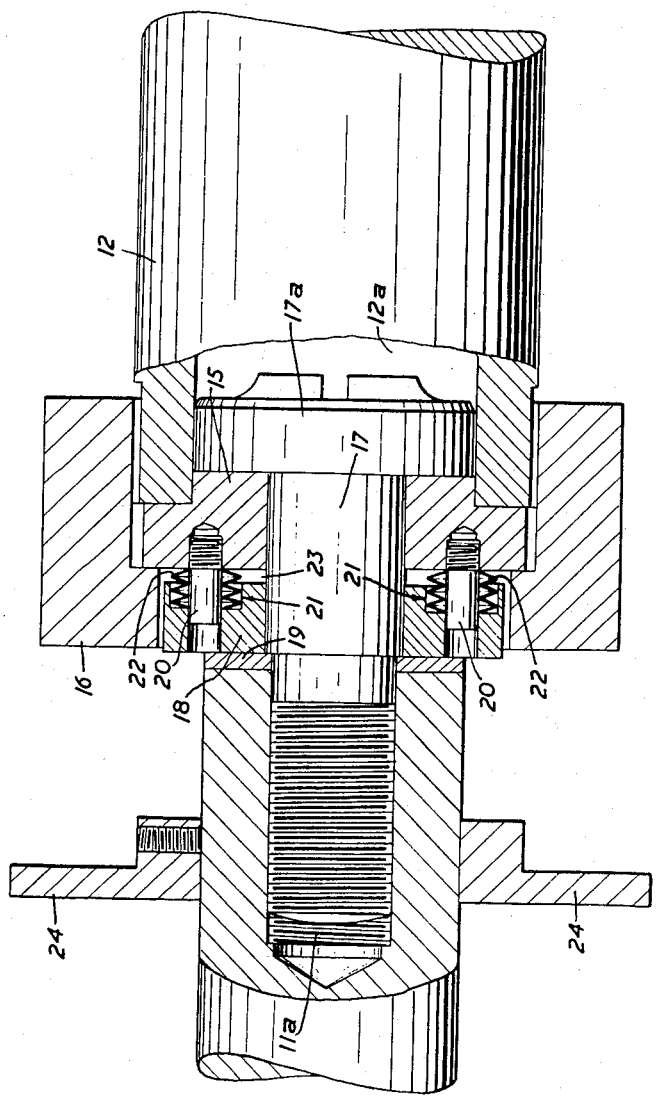

Figure 1 is a part sectional side elevation of an injection moulding machine according to the invention; and
Figure 2 is an enlarged sectional view of the coupling itself with a modified form of spring.

Referring to these drawings the injection moulding machine comprises a preplasticising unit including a chamber 1 into which thermoplastic material is fed in powder or granular form from a hopper 2. The preplasticising chamber 1 is heated by suitable heating elements (not shown) whereby the material is rendered and maintained in a suitable plastic condition. The preplasticising chamber is connected, by a suitable heated conduit 3, with the interior of an injection or transfer cylinder 4 and the plasticised material is transferred through said conduit 3 into the injection or transfer cylinder 4 by a screw conveyor or a reciprocating plunger operating in said preplasticising chamber 1, the screw conveyor or plunger being actuated by an hydraulic cylinder 5 to which an hydraulic fluid is fed through a pipe line 6 by a pump 7 driven by an electric or other motor 8.

The injection or transfer cylinder 4 is provided with heating elements (not shown) to maintain the thermoplastic material in a suitable plastic condition prior to its being injected through an injection nozzle 9, provided with a shut off valve 10, into a mould. Operating in the injection or transfer cylinder is an axially reciprocable plunger 11 operated hydraulically for injecting the material through said injection nozzle into the mould. The material is fed from the above described preplasticising unit into the injection or transfer cylinder 4, in front of the plunger 11, when the latter is in the position shown in Figure 1, that is in its normally fully retracted position and said plunger is operated to effect the injection of the material into the mould at any convenient period after the injection or transfer chamber has been filled with thermoplastic material under a predetermined pressure.

The plunger 11 of the injection or transfer unit is connected at one end by a piston rod 12 with a piston 13 which is slidable in an hydraulic cylinder 14 to which oil or other hydraulic fluid is pumped to act on said piston 13 to actuate the plunger 11.

The general features of construction of the machine so far described are common to injection moulding machines of the type to which the present invention relates and the supply and control of hydraulic fluid to the cylinders 14 and 5 for operating the plungers of the transfer cylinder and preplasticising unit respectively are effected in well known manner and will be understood by those skilled in the art without detailed description.

In accordance with the invention the plunger 11 is coupled to the piston rod 12 of the hydraulic piston 13 by a resilient yieldable coupling which comprises an end plate 15 which is held securely against the end of the piston rod 12 by a retaining nut 16. The end plate 15 is provided with a central hole through which passes the shank of a sliding bolt 17 which screws into an internal screw threaded axial bore 11a in the end of the plunger 11. The bolt 17 is provided with a head 17a which is slidable in an axial bore 12a in the end of the piston rod 12 and abuts against the end plate 15. The shank 17 and the head 17a of the bolt fit with a close sliding fit in the hole in the end plate 15 and the axial bore 12a in the piston rod 12 respectively. Thus the plunger 11 and the piston rod 12 are axially movable relative to each other to a limited extent but are prevented from being disconnected from each other by the head 17a of the bolt 17 abutting against the end plate 15. Mounted on the bolt 17 between the end plate 15 and the end of the plunger 11 is an axially slidable spring loaded buffer ring 18, a washer 19 being fitted between said buffer ring and the end of the plunger 11.

The buffer ring 18 is provided with a plurality of circumferentially spaced holes passing completely through the ring by which said ring is axially slidable on a plurality of pins 20 screwed into and spaced circumferentially around the end plate 15. In the side of the buffer ring 18 facing the end plate 15 the holes through which the pins 20 pass are of enlarged diameter, that is to say they have a diameter larger than the external diameter of the pins 20 whereby an annular recess 21 is formed around each of said pins. Slidably mounted on each of said pins 20 and located within the annular recess is a helical spring 22 (Figure 1) which at one end abuts against the base of the recess 21 and at the other end abuts against the end plate 15. The dimensions of the buffer ring 18 are such that a gap 23 is formed between said buffer ring and the end plate 15. The plunger 11 and the piston rod 12 can therefore move axially relatively to each other, against the action of the springs 22, by an amount limited by the width of said gap 23. Thus a resiliently axially yieldable coupling is formed between the plunger 11 and the piston rod 12.

In the embodiment shown in Figure 1 the springs 22 are of the helically wound type but any other suitable form of springs may be used. Preferably springs of the type shown in Figure 2 are used. These springs consist of a plurality of frusto-conical plates 22a which are slid on to the pins 20 and arranged base to base in pairs.

On the plunger 11 is keyed an abutment, in the form of an annular disc 24, for actuating limit switches 25 and 26 for opening and closing an electric circuit in which is also arranged a solenoid 27 adapted to control valve means 28 which in turn control the supply of hydraulic fluid to the cylinder 5 which drives the screw conveyor or reciprocating plunger in the chamber 1 of the preplasticising unit.

The operation of the injection moulding machine according to the invention is as follows:

Plasticised thermoplastic material is fed from the chamber 1 of the preplasticising unit through the conduit 3 into the transfer or injection chamber 4 as above described. When the volume and pressure of thermoplastic material in the transfer or injection chamber has reached a predetermined limit the hydraulic cylinder 14 operates to drive the plunger 11 forward to inject the charge of thermoplastic material into a mould through the injection nozzle 9. These operations are carried out and controlled in known manner. After the injection stroke of the plunger 11 has been completed, as stated above, the hydraulic cylinder 14 operates to withdraw the plunger 11 to its normally fully retracted position shown in Figure 1 to open the inlet nozzle 3a to permit a new charge of thermoplastic material to be fed through conduit 3 into the forward end of the transfer or injection chamber 4 by the preplasticising unit 1.

The two electric limit switches 25 and 26 are connected in series and switch 25 is normally open and the switch 26 normally closed. That is to say switch 25 is open and switch 26 closed during the whole of the injection stroke of the plunger 11 and said switches remain in the open and closed position respectively until the plunger 11 returns to its retracted position shown in Figure 1, when the abutment 24 operates to close switch 25. Thus the electric circuit is open during the whole of the injection and return strokes of the plunger 11 so that the solenoid controlled valve 28 is closed whereby hydraulic fluid passing from the pump 7 through pipe 29 is by-passed through pipe 30 and a relief-valve 31 back into the reservoir 32 and the preplasticising unit ceases to operate. When the plunger 11 is returned to its retracted position, shown in the drawing the abutment 24 first engages the operating arm 35a of switch 25 to close the switch and thus the electric circuit, whereupon the solenoid 27 is energised and operates to open the valve 28. Hydraulic fluid passing through the pipe 29 from pump 7 is then fed through pipe 6 to the cylinder 5 and thus sets the preplasticising unit 1 into operation whereby thermoplastic material is again fed into the transfer or injection chamber 4. When the transfer chamber 4 is filled and the pressure of the thermoplastic material therein reaches a given pressure it acts on the plunger 11 and forces it back against the action of the springs 22 of the resiliently yieldable coupling to an extreme end position when the buffer ring 18 engages the end plate 15 of the coupling. During this movement, which is limited by the width of the air gap 23, the abutment 24 engages the actuating arm 26a to open the limit switch 26 and break the circuit of solenoid 27 and thus close valve 28 to again release power from the preplasticising unit. When the moving contact 26b of switch 26 moves to break the circuit of solenoid 27 as above described it then engages fixed contacts 26c and 26d to close an electric circuit 33 for controlling the supply of hydraulic fluid to cylinder 14 for operating plunger 11 in known manner. Thus it will be understood that when switch 26 is operated to open the circuit for controlling the supply of hydraulic fluid to cylinder 5 of the preplasticising unit 1 it simultaneously closes the circuit for controlling the supply of hydraulic fluid to cylinder 14 operating the plunger 11 and vice versa and since switches 25 and 26 are in series the preplasticising unit cannot operate during the injection stroke of the plunger 11 and the latter cannot operate when the preplasticising unit is in operation.

The compressive strength of the springs 22 must of course be such that the buffer ring 18 will resist any backward or retracting movement of the plunger 11 until the pressure of the material in cylinder 4 exceeds a predetermined value so that the preplasticising unit will be stopped only when the pressure of the material has reached said predetermined value.

The maximum pressure of the material in the cylinder 4 prior to injection depends upon various factors and will vary according to circumstance, for example, the nature of the thermoplastic material used and the nature of the product being manufactured. In some circumstances the maximum pressure may be such that it is unnecessary to provide springs 22 at all but merely to rely upon lost motion action.

I claim:

1. An injection moulding machine of the type comprising a preplasticizing unit, power operated means for feeding thermoplastic material from said unit into an injection chamber, and a plunger slidably mounted in said injection chamber on a piston rod, and means for actuating said piston rod to advance said plunger in said chamber, thereby ejecting thermoplastic material therefrom, and to retract said plunger to make room in said chamber for additional thermoplastic material, said machine being characterized by the fact that stop means are provided limiting the retraction of said piston, and said plunger is mounted on said piston by means of an axially yielding coupling, switch means being provided for cutting off the supply of power to said thermoplastic material feeding means, said switch means positioned to be actuated by said plunger when pressure in said injection chamber forces said plunger so far backward in said injection chamber as to cause yielding by said coupling when said piston is against said stop means.

2. An injection moulding machine according to claim 1, wherein abutment means are mounted on the plunger to operate two limit switches during the return stroke of the plunger to close and open in sequence an electric circuit in which is arranged a solenoid adapted to close and open a control valve in an hydraulic circuit, for supplying hydraulic fluid to the drive of the preplasticising unit, to stop and then re-start said preplasticising unit.

3. An injection moulding machine according to claim 2, wherein said abutment means and said limit switches are so arranged that one switch is operated to close the electric circuit to stop the preplasticising unit when the plunger is withdrawn to its normal retracted position and the second limit switch is operated to open the electric circuit to re-start the preplasticising unit when the plunger is moved to its extreme end position by the pressure of the thermoplastic material in the transfer or injection chamber.

4. An injection moulding machine according to claim 3, wherein the second limit switch closes an electric circuit for controlling an hydraulic means for operating the plunger substantially simultaneously as it opens the electric circuit to stop the preplasticising unit.

5. An injection moulding machine according to claim 1, wherein the coupling between the piston rod of the plunger operating piston and said plunger is resiliently yieldable in an axial direction and comprises a spring loaded buffer ring slidably movable between the plunger and the piston rod, the spring or springs normally urging said plunger and piston rod away from each other.

6. An injection moulding machine according to claim 5, wherein the buffer ring is slidably mounted between the end of the plunger and an end plate secured to the end of the piston rod on a bolt which connects the piston rod with the plunger and pins circumferentially spaced around an end plate of the piston rod, said pins carrying springs for normally urging the buffer ring away from said end plate.

7. An injection moulding machine according to claim 6, wherein the springs carried by said pins are of helical construction.

8. An injection moulding machine according to claim 6, wherein the springs carried by said pins are frusto-conical plate springs arranged base to base in pairs.

References Cited in the file of this patent

UNITED STATES PATENTS

| | | |
|---|---|---|
| 2,668,325 | Goodwin | Feb. 9, 1954 |
| 2,705,343 | Hendry | Apr. 5, 1955 |
| 2,831,214 | Eyles et al. | Apr. 22, 1958 |